Patented Dec. 10, 1935

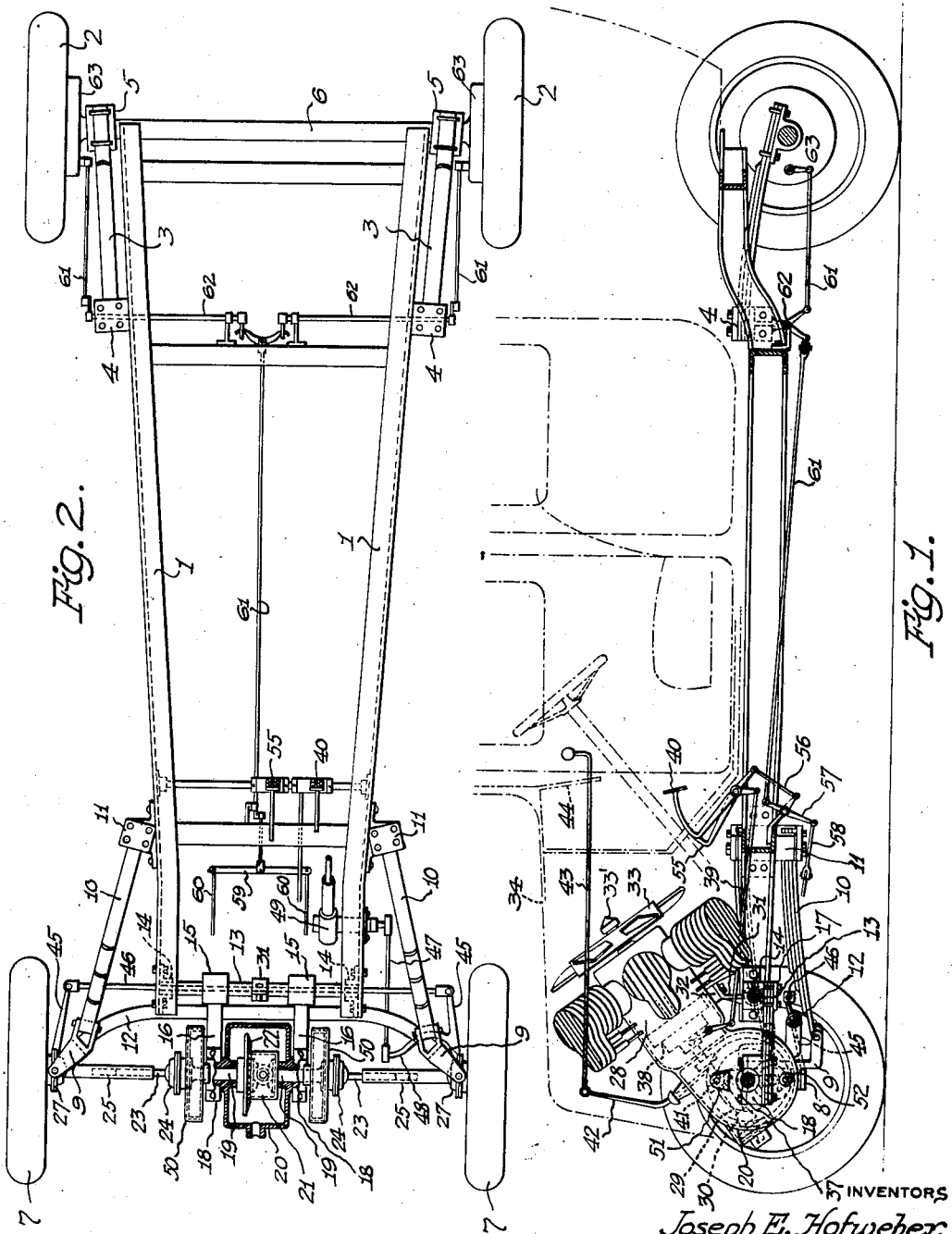

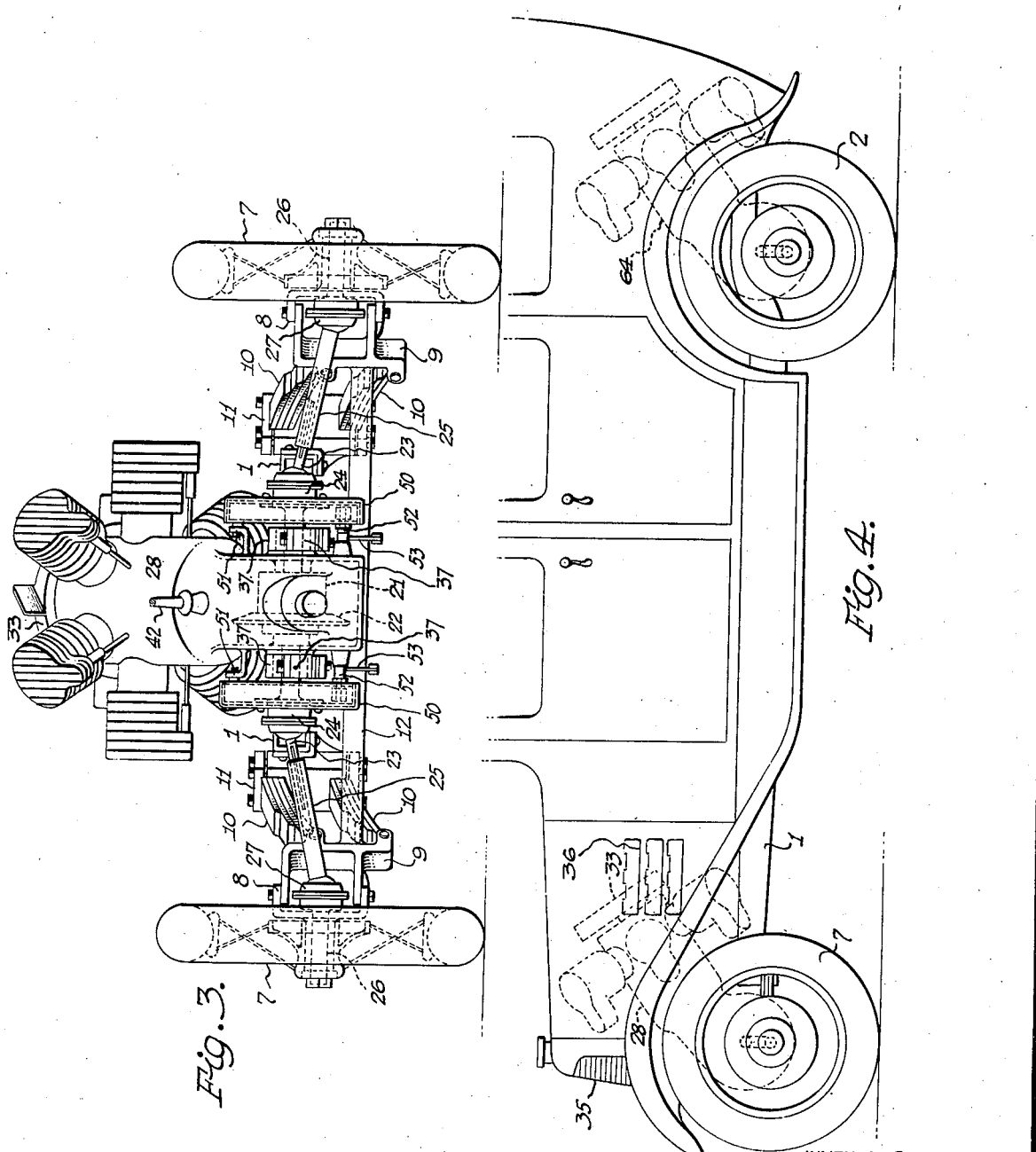

2,024,099

UNITED STATES PATENT OFFICE 2,024,099

DRIVING MECHANISM FOR MOTOR VEHICLES

Joseph E. Hofweber and August J. Hofweber, Detroit, Mich.

Application December 1, 1931, Serial No. 578,317

10 Claims. (Cl. 180—43)

The present invention relates to a new and novel drive mechanism for motor vehicles, and more particularly to the construction and mounting of a power unit and power transmission mechanism, the power unit and power transmission mechanism being suitable for use in a motor vehicle utilizing a front wheel drive, as well as in a motor vehicle utilizing a rear wheel drive.

It is one of the objects of our invention to so mount the power unit that the complete power unit and power transmission mechanism may be readily detached as a single unit.

Another object of our invention is to provide a power unit and power transmission means of compact form and to so mount the power unit and power transmission means as to utilize to the fullest extent the available carrying space in the vehicle.

A further object of our invention is to provide a power unit and power transmission mechanism which may be so mounted as to afford the maximum amount of road clearance, while permitting a low center of gravity in the vehicle as a whole.

It is a further object of our present invention to provide a power unit and power transmission mechanism which is economical to construct, operate, and service.

It is a further object of our present invention to so mount the power unit and power transmission mechanism as to increase the tractive effort of the driving wheels.

It is a further object of our present invention to provide a resilient vibration absorbing support for the power unit and transmission mechanism so that vibrations developed during operation will not be transmitted into the frame or body of the motor vehicle. In this connection it is to be noted that the mounting also prevents a transmission of road vibrations and the like from the vehicle into the power unit.

The accomplishment of the foregoing and other incidental objects is due to the mounting of the power unit and transmission mechanism, and also to the mounting on resilient supporting means in such a manner that the longitudinal axis of the entire unit extends upwardly from the axle carrying the driving wheels. By so mounting the unit its weight is transferred almost entirely to the axle, and through the axle to the driving wheels, resulting in an increase in the tractive effort of such wheels.

By the use of a suitable casing, the power transmission mechanism and the power unit become a single compact unit which may be easily removed from the motor vehicle for the purposes of repair or replacement of the parts therein. Thus the power unit and transmission unit of motor vehicles constructed in accordance with our invention might be repaired at a central repair point without putting the vehicle out of service for any great length of time, inasmuch as it is a simple operation to replace the entire power and transmission unit with a similar unit during such times.

The invention is fully disclosed by way of example in the following description and in the accompanying drawings, in which Fig. 1 is a side elevation, partly in section, of a motor vehicle assembled according to the invention;

Fig. 2 is a plan view of the understructure, partly in section;

Fig. 3 is a front elevation of the front end assembly, and

Fig. 4 is a side elevation of a modified construction.

Reference to these views will now be made by use of like characters which are employed to designate corresponding parts throughout.

In Figs. 1 and 2 is illustrated the frame or chassis 1 which has its rear end supported on wheels 2 by means of quarter elliptic springs 3 having their forward ends secured to brackets 4 carried by the frame and their rear ends attached to clips 5 which in turn are mounted on the rear axle 6 joining the wheels.

The front end is supported from the front wheels 7 through the medium of steering knuckles 8 carried by said wheels. In other words, a double spring seat 9 is carried by each knuckle, and a pair of quarter elliptic springs 10 extends from each spring seat towards the corresponding side of the frame to which they are attached, near the front end of the side, by suitable clamping brackets 11. At the front end is a front or stabilizing axle 12 which has its ends formed integral with the members 9, as shown more clearly in Figs. 1 and 3. A transverse bar 13 is supported across the front end of the frame 1, preferably in brackets 14 secured to the ends of the frame, as shown more clearly in Fig. 2. A pair of spaced blocks 15 are welded to or formed with the rod 13 for the purpose of anchoring the rear ends of the heavy leaf springs 16 which project forwardly, as shown in Figs. 1 and 2. The rear ends of the springs may be secured to the blocks 15 by clamps 17 as also shown in Fig. 1.

On the forward ends of the springs are mounted bearings 18 in which are journaled differential shafts 19. A casing 20 which serves as a differential housing is mounted on the shafts 19 and encloses a conventional differential 21 between the shafts. The differential embodies the usual crown or driven gear 22 which will be referred to in greater detail hereinafter.

The shafts 19 are extended outwardly by shaft sections 23 attached thereto by means of universal joints 24. The shafts are further extended by hollow sections 25 splined on the members 23 and finally connected to the journals 26 of the front wheels by means of universal joints 27. Thus, a driving train is established from the differential 21 to the front wheels 7 through a jointed drive shaft.

The power plant consists preferably of a radial motor whose main casing 28 is bolted to or formed integral with the aforementioned differential housing 20. The main shaft 29 of the motor lies at an angle to the horizontal and carries at its lower end a driving pinion 30 meshing with the crown gear 22. In addition to being supported in the bearings 18, the motor derives its third point of support from a bracket 31 extending upwardly from the rod 13 and engaging the housing 28 preferably through the medium of a rubber block 32. The rear end of the shaft 29 carries a combined fan and fly wheel 33 and distributor 33', the fan serving for cooling purposes. In this connection it may be noted that the motor is housed in a hood 34 having openings 35 in its forward end and adjustable vents 36 at the rear end. Caps 37 are mounted over the shafts 19 and secured upon the bearings 18 whereby the mounting of the power unit is completed.

A clutch 38 is interposed in the shaft 29 and is connected by a suitable linkage 39 to a pedal 40 in the forward part of the vehicle. A variable transmission mechanism 41 of any suitable type is also mounted on the shaft 29 and has an operating lever 42 which in turn is actuated through a rod 43 passing through the dash board 44 of the vehicle as shown in Fig. 1. The weight of the power unit is transferred through the springs 16 to the chassis and thence through the springs 10 to the seats 9 and steering knuckles 8.

Steering arms 45 integral with the knuckles 8 are extended rearwardly therefrom and have their rear ends joined together by a tie rod 46 in the usual manner. A drag link 47 is connected to a finger 48 extending from one of the arms 45 and is actuated by conventional steering mechanism 49. The brakes are applied to the shafts 19 and embody brake drums 50 suitably secured thereto. Fingers 51 extend from the casing 20 into the drums and have the brake shoes (not shown) pivotally mounted thereon. Similar fingers 52 extend from the casing 20 and carry the actuators 53 for the brake shoes. A brake pedal 55 is mounted in the floor of the vehicle in the usual manner and is linked, as at 56, to a rocker 57 also supported at the bottom of the vehicle. From one end of the rocker extends a link 58 carrying the cross bar 59, and links 60 extend from the other end of the rocker 57 and has its rear end connected to a pair of linkages 62 for operating the brakes 63 on the rear wheels.

In the modification shown in Fig. 4, another power unit 64 is applied to the rear axle in any of the positions already mentioned. This unit may be supplemental to the forward unit or it may constitute the sole drive.

The angular mounting of the motor, on an axis extending upwardly from the propeller shaft, brings the motor above the horizontal plane of this shaft and thus provides ample road clearance. In this connection it is to be understood that the axis may be upright or may incline forwardly as well as rearwardly from the propeller shaft, in which case the hood would of course be shaped accordingly. The transmission and differential mechanisms interfere less with the road clearance inasmuch as they are mounted higher than in conventional rear axle construction.

A power unit mounted in this manner is accessible at all its parts for repair purposes without being removed from the drive shaft. After lifting the hood, the unit need only be swung in the bearings 18, and all parts thereof may then be reached. Furthermore, the entire unit may be removed from the vehicle by disconnecting the drive shaft at opposite sides of the power unit, detaching the support 32 and lifting the bearing caps 37. This easy dismounting of the unit enables a novel system of repair and service. Replacement units may be kept in stock by the dealers, and the replaced units may be shipped to a factory or central repair shop where the units are repaired in quantities, with adequate apparatus and machinery, and therefore at less cost and with better workmanship than possible in an independent garage or repair shop.

A further advantage resulting from the use of a radial motor is the compactness made possible by the short extent of its axis and by the mounting of the transmission and differential mechanisms directly adjacent to the motor housing. Thus, the horizontal extent of the power unit is reduced, thereby conserving carrying space within the vehicle and reducing vibration.

It will also be understood that the upwardly extending position of the power unit concentrates its weight towards the drive wheels. This is a decided advantage inasmuch as greater traction and braking efficiency are provided than if the unit were extended a greater distance over the chassis. The superior cooling characteristics of the radial motor are also present and thus add to the efficiency of the machine. The resilient mounting of the power unit absorbs vibration.

Although specific embodiments of the invention have been illustrated and described, it will be understood that various alterations in the details of construction may be made without departing from the scope of the invention, as indicated by the appended claims.

What we claim is:—

1. In a motor vehicle, a transverse drive shaft, and driving mechanism therefor, including a motor mounted above said transverse drive shaft and having its longitudinal axis extending on a line other than vertical or horizontal to said shaft, means for transmitting the power from said motor to said shaft, and means for supporting said driving mechanism in said vehicle and including extending arms secured to the frame of said vehicle, bearings secured to said arms, and means associated with the casing of said driving mechanism and adapted to be received in said bearings in such a manner that said driving mechanism may be removed as a unit.

2. In a motor vehicle a frame, cushion means for supporting a power unit secured thereto and including separable bearings secured to resilient extending arms, a power unit for said vehicle, a transverse shaft operatively connecting said power unit and driving wheels, a casing for said power unit, means associated therewith for permitting connection of said transverse driving shaft and said power unit, a portion of said casing being adapted to be received in said separable bearings whereby said power unit may be removed from said motor vehicle on separation of said bearings and disconnection of said means connecting said transverse driving shaft and said power unit.

3. In a motor vehicle a frame, means for supporting a power unit secured thereto and including separable bearings secured to extending arms, a power unit for said vehicle including a radial motor, clutch, transmission and differential mechanism and a unitary casing therefor, a transverse drive shaft operatively connecting said power unit and driving wheels for said vehicle, and means extending through said casing and permitting said transverse drive shaft to be operatively connected with said differential, and means secured to said casing and adapted to be received by said separable bearings whereby said power unit may be removed from said vehicle as a unit on separation of said bearings.

4. In a motor vehicle, a frame, resilient supporting means extending therefrom, bearings on said means, a motor having a casing structure journalled in said bearings, a transverse shaft extending through said casing structure and journalled therein coaxially with said bearings, said motor having a crank shaft geared to said transverse shaft.

5. In a motor vehicle, a frame, resilient supporting means extending therefrom, bearings on said means, a motor having a casing structure journalled in said bearings, a transverse shaft extending through said casing structure and journalled therein coaxially with said bearings, said motor having a crank shaft geared to said transverse shaft, and removable caps for said bearings, whereby said casing structure and motor may be removed on removal of said caps.

6. In a motor vehicle, a frame, resilient supporting means extending therefrom, bearings on said means, a motor having a casing structure journalled in said bearings, a transverse shaft extending through said casing structure and journalled therein coaxially with said bearings, said motor having a crank shaft geared to said transverse shaft, the axis of said motor extending upwardly from said transverse shaft.

7. In a motor vehicle, a frame, resilient supporting means extending therefrom, bearings on said means, a motor having a casing structure journalled in said bearings, a transverse shaft extending through said casing structure and journalled therein coaxially with said bearings, said motor having a crank shaft geared to said transverse shaft, and a differential mounted in said casing structure and inserted in said transverse shaft.

8. In a motor vehicle, a frame, resilient supporting means extending therefrom, bearings on said means, a power unit having a casing structure journalled in said bearings, a transverse shaft extending through said casing structure and journalled therein coaxially with said bearings, said power unit including a motor having a crank shaft geared to said transverse shaft by means of a differential mounted in said casing structure between said crank shaft and said transverse shaft, and a transmission mechanism in said casing structure between said motor and said differential.

9. In a motor vehicle, a frame, resilient supporting means extending therefrom, bearings on said means, a power unit having a casing structure journalled in said bearings, a transverse shaft extending through said casing structure and journalled therein coaxially with said bearings, said power unit including a radial motor having a crank shaft, means for gearing said crank shaft to said transverse shaft and including a differential mounted in said casing structure and inserted in said transverse shaft, and transmission mechanism in said casing structure between said crank shaft and said differential.

10. In a motor vehicle, a frame, resilient supporting means extending therefrom, bearings on said means, a power unit having a casing structure journalled in said bearings, a transverse shaft extending through said casing structure and journalled therein coaxially with said bearings, said power unit including a radial motor having a crank shaft, means for gearing said crank shaft to said transverse shaft and including a differential mounted in said casing structure and inserted in said transverse shaft, and transmission mechanism in said casing structure and mounted on a portion of said crank shaft, the axis of said power unit being inclined upwardly from said transverse shaft.

JOSEPH E. HOFWEBER.
AUGUST J. HOFWEBER.